United States Patent [19]

Suzuki et al.

[11] Patent Number: 4,554,662

[45] Date of Patent: Nov. 19, 1985

[54] INPUT SIGNAL TESTING DEVICE FOR ELECTRONIC COPIER

[75] Inventors: Takanobu Suzuki; Kenichiro Nakayama; Izumi Takahashi; Terumasa Sugiyama, all of Kanagawa, Japan

[73] Assignee: Fuji Xerox Co., Ltd., Tokyo, Japan

[21] Appl. No.: 398,466

[22] Filed: Jul. 15, 1982

[30] Foreign Application Priority Data

Jul. 15, 1981 [JP] Japan ............................... 56-109217

[51] Int. Cl.[4] ............................................ G06F 11/00

[52] U.S. Cl. ........................................ 371/20; 371/29

[58] Field of Search .................. 364/200, 900; 371/24, 371/20, 29, 17, 18; 355/14 C, 14 R; 324/73 R, 73 AT

[56] References Cited

U.S. PATENT DOCUMENTS

| | | | |
|---|---|---|---|
| 4,062,061 | 12/1977 | Batchelor et al. | 371/29 |
| 4,122,996 | 10/1978 | Wilczek | 371/29 |
| 4,133,477 | 1/1979 | Marino et al. | 371/20 |
| 4,162,396 | 7/1979 | Howard et al. | 371/20 |
| 4,186,299 | 1/1980 | Batchelor | 355/14 C |
| 4,206,995 | 6/1980 | Legg | 371/20 |
| 4,245,309 | 1/1981 | Kiefer | 371/29 |
| 4,266,294 | 5/1981 | Daughton et al. | 364/900 |
| 4,275,464 | 6/1981 | Schmidt | 371/29 |
| 4,297,029 | 10/1981 | Carlson | 371/29 |
| 4,477,901 | 10/1984 | Braband et al. | 371/20 |
| 4,480,329 | 10/1984 | Gordebeke | 371/20 |
| 4,499,580 | 2/1985 | Takahashi et al. | 371/20 |

*Primary Examiner*—Michael R. Fleming
*Attorney, Agent, or Firm*—Sughrue, Mion, Zinn, Macpeak, and Seas

[57] ABSTRACT

An electronic copier is provided with a control section having a test mode whereby the inputs from various detectors positioned at various locations in the copier can be tested, and the results may be displayed on a display device normally used for displaying the number of copies to be made, etc.

3 Claims, 4 Drawing Figures

INPUT SIGNAL TESTING DEVICE FOR ELECTRONIC COPIER

BACKGROUND OF THE INVENTION

This invention relates to an input signal testing device for an electrophotographic copier which employs a microcomputer in its control section.

In general, detectors are provided at various sections of an electrophotographic copier, to detect the operating conditions of the sections. The detection signals are applied to the microcomputer in the control section. In the microcomputer, the input signals are compared with preset data, and the comparison results are applied to a control system for the various sections of the copier, to control the various sections. In such a copier, as the number of functions is increased, the number of signals applied to the control section is increased. Therefore, heretofore, in order to check whether or not the input signals were satisfactory, the points to be checked has to be studied by referring to the circuit diagram or the operation manual in advance. Thus, much time and labor was required to test the input signals. That is, the conventional method was disadvantageous in this point.

SUMMARY OF THE INVENTION

An object of this invention is to eliminate the above described difficulty. More specifically, an object of the invention is to provide an input signal testing device for an electrophotographic copier in which whether or not the input signals applied to the control section are satisfactory can readily be checked using the stepping operation of a display unit adapted to display the number of copies, to thereby facilitate the maintenance and inspection of the copier.

DETAILED DESCRIPTION OF THE PREFERRED EMBODIMENTS

Figure 1:
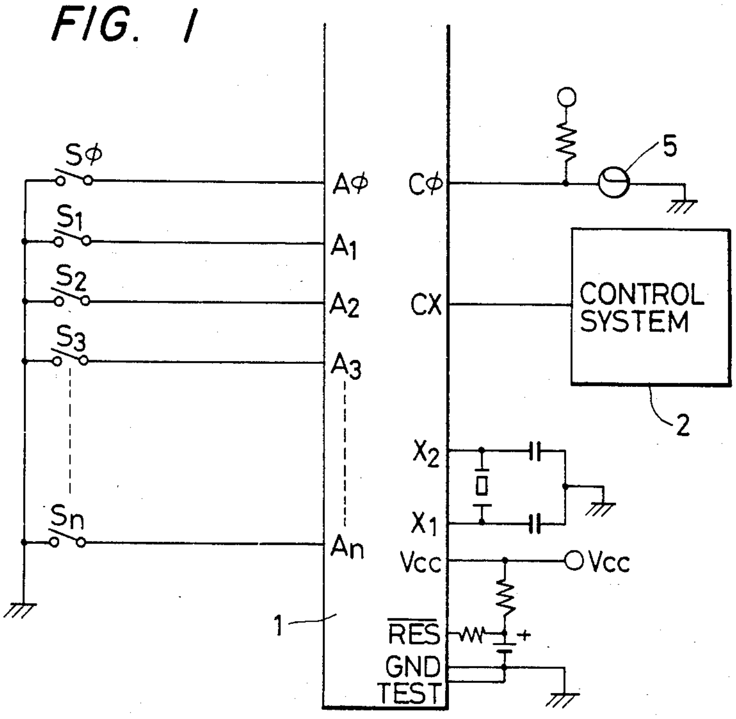
FIG. 1 is a circuit diagram showing a control section of the invention.
Figure 2:
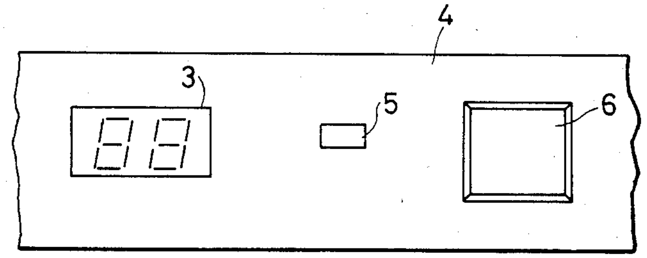
FIG. 2 is a front view of an operation panel.
Figure 3:
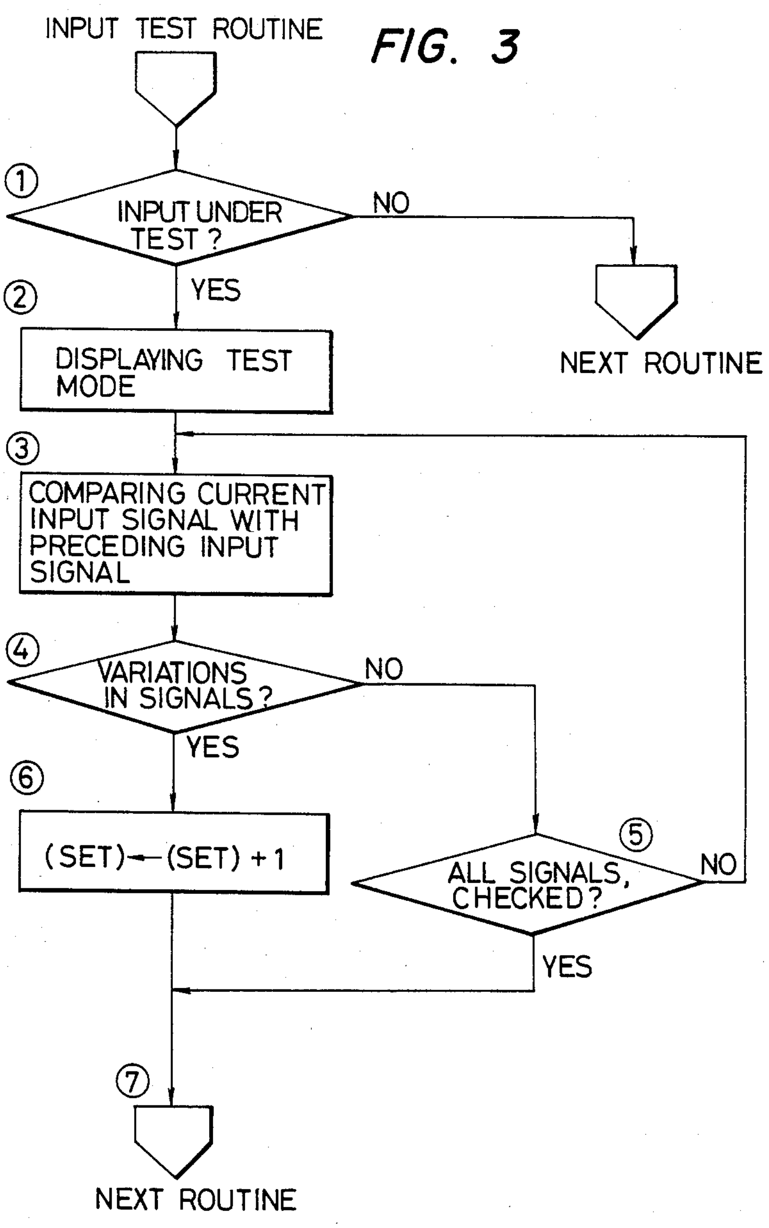
FIG. 3 is a flow chart for describing the operation of the embodiment.

Embodiments of this invention will now be described with reference to the accompanying drawings. In FIG. 1, reference numeral 1 designates the control section of an electrophotographic copier (not shown), which is made up of a microcomputer. Detectors $S_1$, $S_2$, . . . and $S_n$ are provided at various sections of the copier. The status signals of the several sections are provided by these detectors and are applied to input ports $A_1$, $A_2$, . . . and $A_n$ of the control section. The signals from the detectors $S_1$ through $S_n$ are compared with data which have been set in the control section 1 in advance. The result of comparison is applied through an output port $C_x$ to a control system 2, which operates to control the various sections of the copier. A test switch $S_\phi$ is connected to an input port $A_\phi$ of the control section 1. When the test switch $S_\phi$ is turned on in testing the copier, a test mode is provided for the control section 1. Thereafter, the input signals are checked as follows:

In order to determine whether or not an input signal from the copier is satisfactory, after the power switch of the copier is turned on, a display unit 3 (FIG. 2) for displaying the number of copies is set to "00" and then the test switch $S_\phi$ is turned on. Accordingly, the operation of the testing sequence (FIG. 3) is advanced from Step (1) through to Step (3). Thus, a test mode is provided for the control section 1, and a test display unit 5 on the operation panel 4 is caused to flicker by a signal outputted through an output port $C_\phi$, thus indicating the operation of the test mode.

Next, a copying start button 6 (FIG. 2) is depressed to operate the copier, as a result of which the status signals of the sections are applied to the control section 1 by the detectors $S_1$ through $S_n$ provided at the various sections of the copier. As the operation step is advanced to Step (3), the detectors are sequentially turned ON and OFF, and in the control sectin 1, the current signal from a given detector is compared with the preceding signal therefrom. When these signals involve no variation (the given detector being inoperable), the operation step is advanced to Step (5) where it is determined whether or not all the input signals have been checked. If not, the operation step is returned to Step (3) again, so that the above-described operations are repeated. If, in Step (4), the successive input signals from a detector involve a variation (the detector being operable), then the operation step is advanced to Step (6), in which a signal (+1) for adding one (1) to the display content of the display unit 3 is outputted through the output port $C_x$; that is, the value one (1) is added to the display data of the display unit 3. In other words, since the display unit 3 was set to "00" in advance as described before, the numeral "1" is now displayed on the display unit 3. In the abovedescribed stepping operation, one (1) is added for each of the detectors $S_1$ through $S_n$ in the ON or OFF states; that is, the value two (2) is added when a detector $S_1$, $S_2$, . . . $S_n$ is turned ON and then OFF. Thus, it can be checked whether the detectors $S_1$ through $S_n$ are operable or inoperable when turned ON and OFF. When all the input signals from the detectors $S_1$ through $S_n$ have been checked, the operation step is advanced to Step (7), in which the operation is advanced to the next routine.

Figure 4:
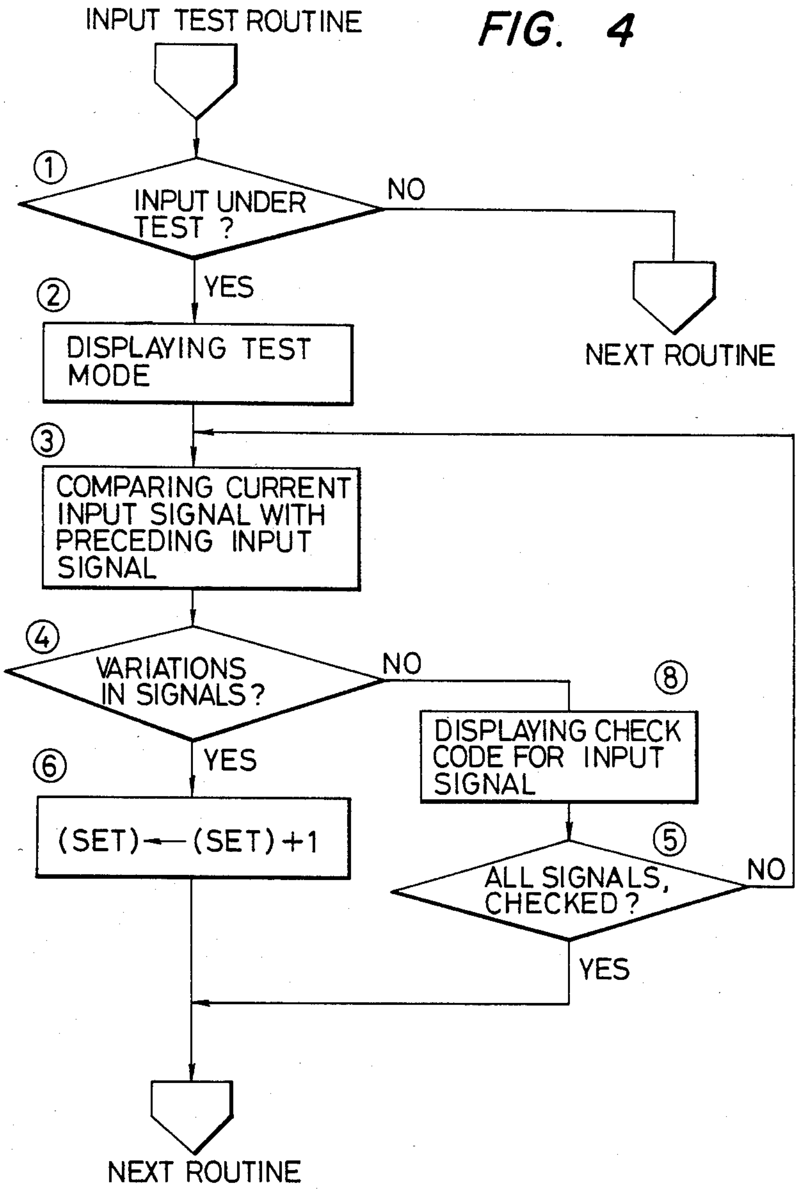
FIG. 4 is a flow chart showing another embodiment of the invention.

As is apparent from the above description, it can be readily detected by merely collating the number of checks carried out with the data displayed on the display unit 3 whether or not the operations of all of the detectors $S_1$ through $S_n$ are operable. A given abnormal circuit path may be instructed as follows: In the case where, as shown in FIG. 4, the input signals involve no variation in Step (4), the operation step is then advanced to Step (8), in which a check code which is predetermined for each of the detectors $S_1$ through $S_n$ is displayed on the display unit 3. As a result, the abnormal circuit path can be readily detected from the check code thus displayed.

As was described above, according to the invention, whether or not the input signals from the detectors at various sections in the copier are satisfactory is displayed on the display unit for displaying the number of copies by operating the copier in a test mode. Therefore, a number of input signals are applied to the control section, and it can be readily detected whether or not the input signals are normal. Thus, the testing operation can be achieved quickly with high efficiency. Furthermore, by displaying a check code on the display unit, the corresponding abnormal circuit path can be readily detected.

What is claimed is:

1. An input signal testing device for an electronic copier, comprising: 'a control section for controlling the operations of various sections of said copier;

a plurality of detectors providing input signals to said control section, controlled by said control section and located at said various sections of said copier;

means for displaying a number of copies to be made, controlled by said control section;

a test switch, which when actuated, causes said control section to operate in a test mode to test a plurality of said input signals, wherein said control section, in said test mode, effects changes in said various sections to thereby change said detectors, checks variations in input signals inputted from said detectors before and after said changes in the various sections, and controls said display means to indicate with one signal any abnormality in the results of said checking of said plurality of detectors when said test switch is actuated; and a plurality of interconnection means between said control section, said detectors, said displaying means and said test switch; wherein said control section receives from said plurality of detectors a corresponding plurality of sets of at least a first input signal and a second input signal at different times on the same interconnection means for each set; and said control section further comprises means for comparing said first and second input signals in each set to detect an abnormality.

2. A device as claimed in claim 1, said control section including a separate input port for receiving said set of input signals from each said detector.

3. A device as claimed in claim 1, said display means including means for displaying an error code upon detection by said control section of an abnormality in said sets of inputs from all said detectors.

* * * * *